US009990570B2

(12) United States Patent
Shirai

(10) Patent No.: US 9,990,570 B2
(45) Date of Patent: Jun. 5, 2018

(54) INFORMATION PROCESSING APPARATUS THAT DETERMINES SPOOLING COMPLETION, AND METHOD FOR INFORMATION PROCESSING APPARATUS

(71) Applicant: CANON KABUSHIKI KAISHA, Tokyo (JP)

(72) Inventor: Kenichi Shirai, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 51 days.

(21) Appl. No.: 14/973,797

(22) Filed: Dec. 18, 2015

(65) Prior Publication Data

US 2016/0179450 A1 Jun. 23, 2016

(30) Foreign Application Priority Data

Dec. 22, 2014 (JP) .................. 2014-259279

(51) Int. Cl.
*G06F 3/12* (2006.01)
*G06K 15/02* (2006.01)
*G06F 9/00* (2006.01)

(52) U.S. Cl.
CPC ........... *G06K 15/02* (2013.01); *G06F 3/1203* (2013.01); *G06F 3/1247* (2013.01); *G06F 3/1285* (2013.01); *G06F 9/00* (2013.01)

(58) Field of Classification Search
CPC ..... G06K 15/02; G06F 3/1203; G06F 3/1247; G06F 3/1285; G06F 9/00
See application file for complete search history.

(56) References Cited

U.S. PATENT DOCUMENTS

2006/0221368 A1* 10/2006 Higuchi .............. G06F 3/1204
358/1.13

FOREIGN PATENT DOCUMENTS

JP  2007328558  *  8/2006
JP  2007-328558 A  12/2007

OTHER PUBLICATIONS

English machine translation of JP2007328558.*

* cited by examiner

*Primary Examiner* — Iriana Cruz
(74) *Attorney, Agent, or Firm* — Rossi, Kimms & McDowell LLP

(57) ABSTRACT

An information processing apparatus in which an application for print control and a printer driver corresponding to a destination printer operate, comprises a unit configured to, by performing a listening at a listening port designated by a loopback address, receive from the printer driver, on which the designated port is set as a transmission port by the application, print data generated based on data from the application; a unit configured to determine, according to completion of communication corresponding to the print data, a spooling completion of the print data; a unit configured to specify, from the received print data, information corresponding to the data from the application; and a unit configured to notify to the application the determined spooling completion, the print data, and the specified information.

9 Claims, 8 Drawing Sheets

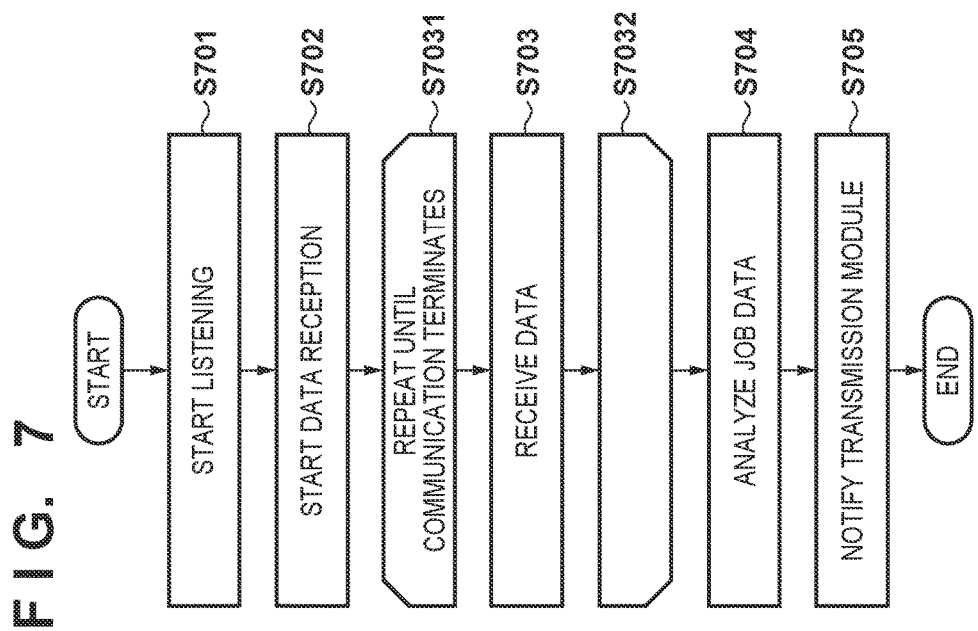

INFORMATION PROCESSING APPARATUS THAT DETERMINES SPOOLING COMPLETION, AND METHOD FOR INFORMATION PROCESSING APPARATUS

BACKGROUND OF THE INVENTION

Field of the Invention

The present invention relates to an information processing apparatus, and a method for an information processing apparatus.

Description of the Related Art

Commonly, when a user executes print processing in a Windows system, the user performs a print instruction after designating a standard port monitor incorporated in the Windows system in advance. In accordance with the standard port monitor, print data that is generated by a printer driver is transmitted to a printing apparatus. However, because the standard port monitor deletes a print job when transmission of the print data to a printing apparatus completes, the only way for a user to know that discharge is complete was to actually confirm the state of the printing apparatus. To avoid the previously described problem, a method in which a custom port monitor is prepared in a print server or the like that manages printing, and the custom port monitor is used to perform necessary processing in the print server is known. For example, by transmitting printer driver generated print data and print job attribute information, such as a document name or a print attributes, from the custom port monitor to the print server, and holding the print data and the print job attribute information on the print server side, it is possible to manage the printing until discharge completion.

However, a system in which only a standard port monitor operates is considered. For example, in the present Microsoft Windows 8, a new architecture for printer drivers has been introduced, and there is an arrangement in which a custom port monitor cannot be registered in the Windows system. In such a system, it is not possible to use a custom port monitor to realize a function such as, on a print server side, saving print related data such as print data, print job attribute information or the like, and print job management until discharge completion. Japanese Patent Laid-Open No. 2007-328558 proposes a method in which print data received by a first port of a printing apparatus is converted to a format that can be handled, and a module that performs the conversion uses a loopback address to transmit the converted data to a second port. However, the method illustrated by Japanese Patent Laid-Open No. 2007-328558 is a method that can be realized because a transmission source and a transmission destination of the print data are within the same application. For example, generally, in the case of a Windows spooler and a print server, it is not possible for the print server to cause necessary processing to be performed from the print server to the standard port monitor, and cause transmission of print data to the print server.

SUMMARY OF THE INVENTION

The present invention provides an information processing apparatus and a method for an information processing apparatus that realize obtaining print related data by an application, and management of printing, without using a custom port monitor.

The present invention comprises the following configuration.

According to the present invention, there is provided an information processing apparatus in which an application for print control and a printer driver corresponding to an output destination printer operate, the apparatus comprising at least one processor and at least one memory coupled to each other and cooperating to act as: a reception unit configured to, by performing a listening at a listening port designated by a loopback address, receive from the printer driver, on which the designated port is set as a transmission port by the application, print data generated based on data from the application; a determination unit configured to determine, in accordance with completion of communication corresponding to the print data by the reception unit, a spooling completion of the print data; a specifying unit configured to specify, from the received print data, information corresponding to the data from the application; and a notification unit configured to notify to the application the determined spooling completion, the print data, and the specified information.

By virtue of the present invention, transferring print data and print related data such as print job attribute information from a standard port monitor to an application becomes possible, and it is possible to realize obtaining the print related data by the application, and management of printing, without using a custom port monitor.

Further features of the present invention will become apparent from the following description of exemplary embodiments with reference to the attached drawings.

BRIEF DESCRIPTION OF THE DRAWINGS

FIG. 7 is a flowchart illustrating processing from a print data reception module 403 receiving print data from the printer driver 410 until notifying of a transmission module 404.

FIG. 8 is a flowchart illustrating processing from the transmission module 404 accepting print data and print job attribute information from the print data reception module 403 until discharge in a printer 103 completes.

DESCRIPTION OF THE EMBODIMENTS

Hereinafter, embodiments for working the present invention are explained using drawings.

First Embodiment

<System Configuration>

Figure 1:
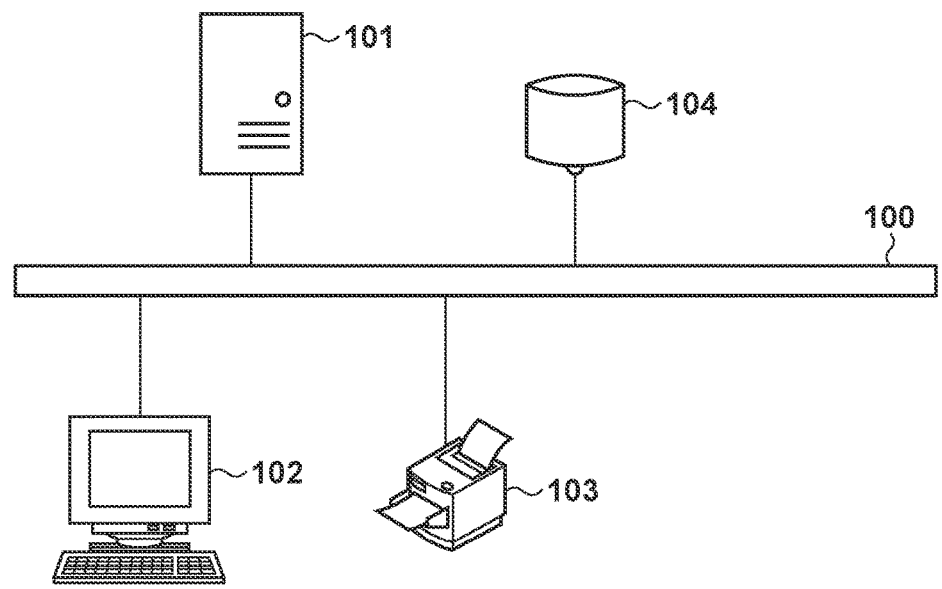
FIG. 1 is a view for illustrating an overall configuration of a printing system.

FIG. 1 is a view for illustrating an overall configuration of a printing system according to embodiments of the present invention. In FIG. 1, a print server 101, a client terminal 102, a printer 103, and a database 104, are connected via a network 100.

For example, the network 100 is any of a LAN, a WAN such as the Internet, a telephone line, a dedicated digital line, an ATM or a frame relay line, a cable TV line, a wireless line for data broadcast, or the like. It may also a so-called communication network realized by a combination of these. The network 100 only has to be something for which transmission and reception of data is possible. The means of communication from the client terminal 102 to the print server 101, and from the print server 101 to the printer 103 which is an output destination may be different. Communication between apparatuses included in the present embodiment may be wired communication that uses Ethernet cables, or may be wireless communication that uses radio waves, light, or the like.

The print server 101 has an external interface, which receives document data and print instruction requests from a Web browser of the client terminal 102 or another system (not shown). The print server 101 holds document information 500 of the document data, job information 510 of a print job, printer information 520, and print data reception module information 530 in the database 104 (refer to FIG. 5A to FIG. 5D). A plurality of the print server 101 may exist, and in such a case, it is possible to take a configuration that is caused to have redundancy by virtually behaving as one print server in accordance with a load balancer. The print server 101 monitors or manages the printer 103, controls or monitors print jobs, and transfers print jobs to the printer 103. Note that a printer driver 410 to be explained later is installed in the print server 101, and flowcharts described in FIG. 6 to FIG. 8 are executed on the print server 101.

The client terminal 102 is, for example, a desktop personal computer, a notebook computer, a mobile personal computer, a PDA (personal data assistant), or the like, but may be a cellular phone in which an execution environment for programs is incorporated. In the client terminal 102, an environment that executes a program such as a Web browser (an Internet browser, a WWW browser, a browser available for use of the World Wide Web) is incorporated.

The database 104 is a bulk storage unit, and stores the print data reception module information 530, the printer information 520, the job information 510 of a print job, and the document information 500 of document data, which the print server uses. Note that, in the present embodiment, the print server 101 takes a configuration that uses the database 104 on the network 100, but a configuration in which the database 104 is held inside the device of the print server 101 may be taken.

<Hardware Configuration>

Figure 2:
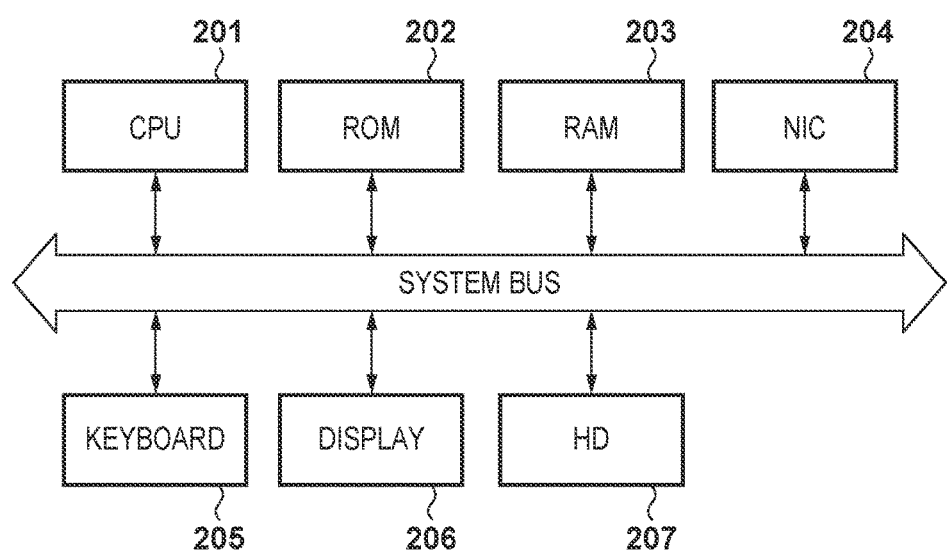
FIG. 2 is a hardware configuration diagram of a print server 101 and a client terminal 102.

FIG. 2 is a hardware configuration diagram of the print server 101 and the client terminal 102 of the printing system according to embodiments of the present invention. While there is no particular limitation, it goes without saying that the present invention can be applied to stand-alone devices or systems comprised from a plurality of devices if functions of the present invention can be executed. While there is no particular limitation, if functions of the present invention can be executed, it goes without saying that the present invention can be applied even to a system in which connections are made via a network such as a LAN or a WAN, and processing is performed.

A CPU 201 is a control apparatus of an information processing apparatus, and executes an operating system, a print driver program, and an application program stored in an HD 207, and a printing system program according to the present invention. The CPU 201 performs control to temporarily store information, a file or the like necessary for a program execution in a RAM 203. The CPU 201 opens various registered windows and executes various data processing based on commands instructed by a mouse cursor (not shown) or the like on a display 206.

A ROM 202 is a non-volatile storage unit, and stores internally a program such as a basic I/O program, font data used in document processing, and various data such as template data. The RAM 203 is a temporary storage unit, and functions as a main memory, a work area or the like of the CPU 201.

An interface 204 is an input/output unit, and the information processing apparatus exchanges data with an external apparatus via the interface 204. A keyboard 205 is an instruction input unit, and is for a user to input an instruction for an order or the like to a print server or the like. The display 206 is a display unit, and displays a command or the like input from the keyboard 205. A hard disk (HD) 207 is an external storage unit, and functions as a large capacity memory. The HD 207 stores a printing system program according to the present invention, an application program, a print driver program, an OS, or the like.

<Memory Map>

Figure 3A:
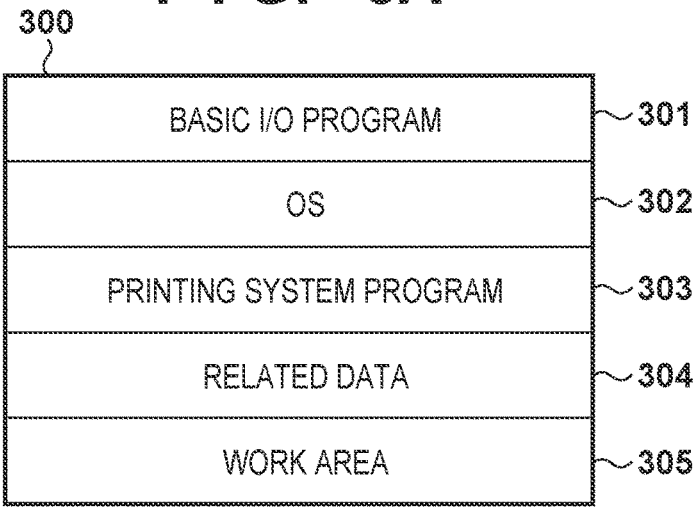
FIG. 3A and FIG. 3B are views for illustrating examples of a memory map of a RAM 203.
Figure 3B:
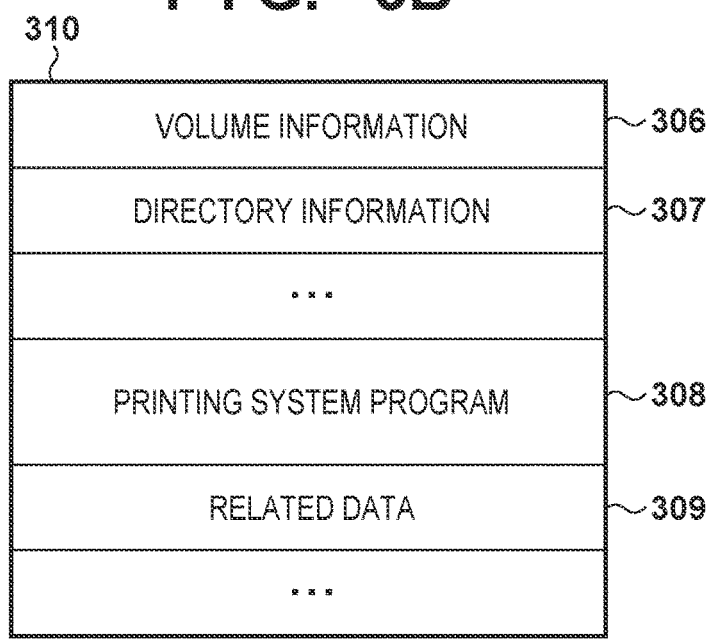

FIG. 3A and FIG. 3B are views for illustrating examples of memory maps of the RAM 203 illustrated in FIG. 2, according to embodiments of the present invention, and are memory maps of a state in which the printing system program loaded from the HD 207 is loaded into the RAM 203 and can be executed. In the present embodiment, an example in which the printing system program and related data are directly loaded from the HD 207 to the RAM 203 and caused to execute is illustrated, but also, a medium that stores the printing system program may be a CD-ROM, a CD-R, a PC card, a DVD, or an IC memory card rather than an HD. Furthermore, it is also possible to configure so as to store the printing system program in the ROM 202, have it form part of a memory map, and directly execute it on the CPU 201. In addition, it is possible to configure software that realizes functions equivalent to that of each apparatus above as an alternative to hardware apparatuses.

A memory map 300 of FIG. 3A illustrates each region allocated in the RAM 203. A basic I/O program 301 is a region that includes a program having, for example, an IPL (Initial Program Loading) function of, when a power supply of the information processing apparatus is turned on, reading the OS from the HD 207 into the RAM 203, and causing operation of the OS to start. An operating system (OS) 302 is a program that performs, for example, management of resources of a computer. A printing system program 303 according to the present embodiment is stored in a region allocated in the RAM 203, and is executed by the CPU 201. Related data 304 is data stored in a region allocated in the RAM 203, or a storage region therefor. For a work area 305, a region that the CPU 201 uses to execute the printing system program is allocated.

A memory map 310 of FIG. 3B is an example of a memory map of the HD 207 illustrated in FIG. 2, and illustrates data content of the HD 207. The HD 207 includes management information such as volume information 306 and directory information 307, a printing system program 308 according to the present embodiment, and related data 309 of the printing system program 308. The printing system program 308 is something programmed based on flowcharts explained in the present embodiment, and in the present embodiment, the print server 101 has a similar configuration. The printing system program 308 may be referred to as a print program 308.

<Printing System>

Next, explanation is given for print processing of the printing system according to the present embodiment. Note that print processing of the printing system is executed by the above described printing system program 308. Each software module of the printing system program 308 is stored in the HD 207, and is loaded into the RAM 203 and executed by the CPU 201.

<Module Configuration>

Figure 4:
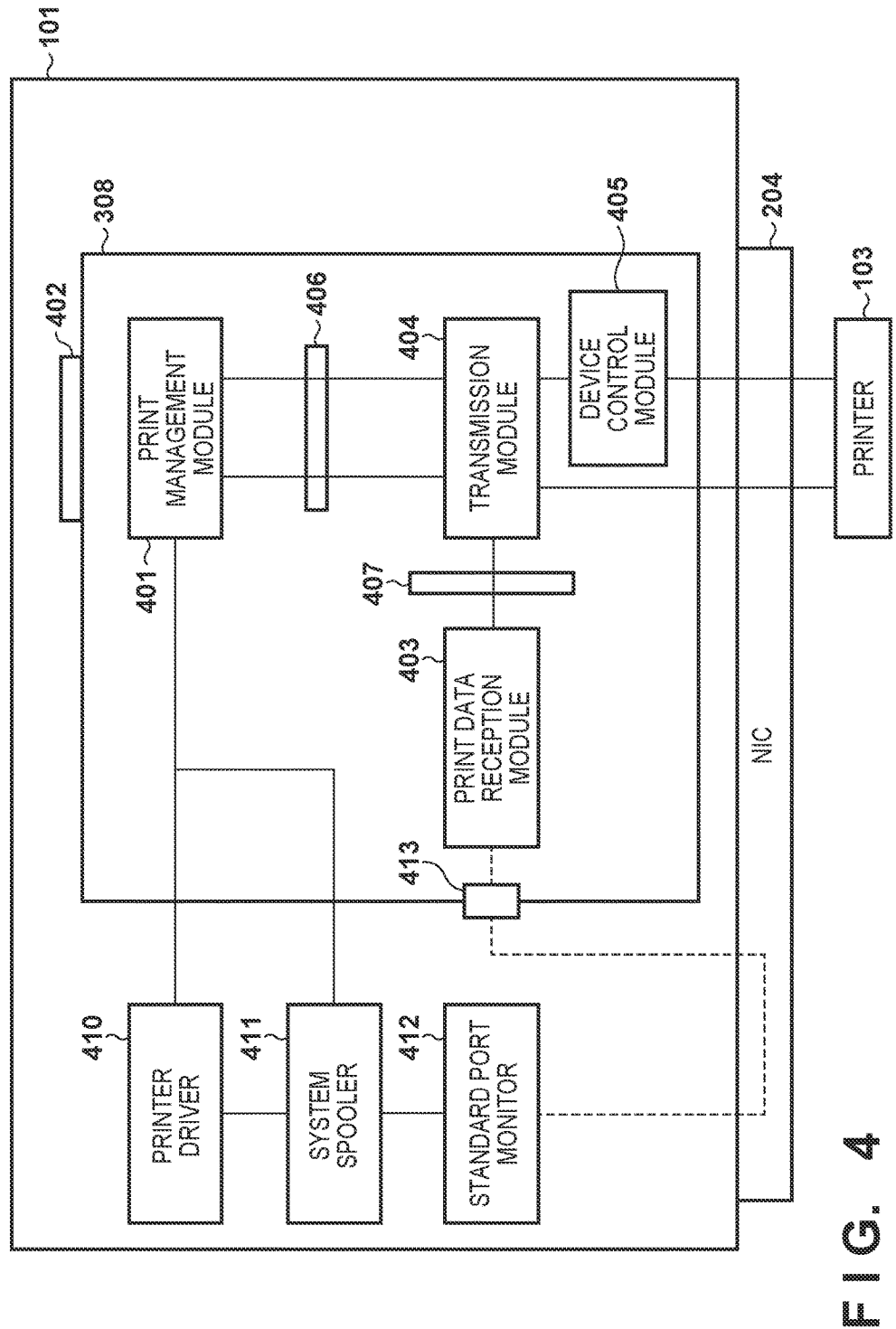
FIG. 4 is a view for illustrating a module configuration of a printing system.

FIG. 4 is a view for illustrating a module configuration of a printing system according to embodiments of the present invention. In the present embodiment, the printing system program 308 includes a print management module 401, a print data reception module 403, a transmission module 404, and a device control module 405. The print management module 401 and the transmission module 404 as well as the print data reception module 403 and the transmission module 404 respectively exchange information via software interfaces (API) 406 and 407. Note that, in the present embodiment, each of the print management module 401, the print data reception module 403, the transmission module 404, and the device control module 405 take an independent configuration, but if similar functions can be realized, there is no particular limitation to this configuration. In the present embodiment, the operating system (OS) envisions a Windows system provided by Microsoft Corporation. Particularly, in the present embodiment, an OS that has an arrangement in which it is not possible to register a custom port monitor created by a vendor that provides a printer or a print server is envisioned.

The printer driver 410, a system spooler 411, and a standard port monitor 412 are provided by the operating system 302. However, the printer driver may include a module provided by a manufacturer.

The print management module 401 receives document data or a print instruction from the client terminal 102 or another application via an external interface 402. The print management module 401 saves the received document data or the document information 500 in the database 104. At a time of print processing, the print management module 401 performs an exchange of information with the transmission module, such as an obtaining of a print reservation instruction or a print job, and makes a rendering instruction towards the printer driver 410. The print management module 401 performs, with respect to the system spooler 411, an instruction for modifying a print port that the standard port monitor 412 controls. For example, something originally set by the printer 103 is changed to a listening port of the print data reception module 403 and a loopback address. Here, the system spooler 411 is one function provided by the printing system of the above described OS. The system spooler 411 receives print data generated by the printer driver 410, temporarily saves it in the HD 207, and performs, for example, management of printer objects. In addition, an application can perform operations such as creating, changing or deleting a printer object with respect to the system spooler 411, via an API (Application Program Interface) that the OS provides.

The print data reception module 403 receives print data transmitted from the standard port monitor 412, and transmits it to the transmission module 404. The print data reception module 403 also performs analysis of the received print data, obtains necessary print job attribute information by the transmission module 404, and then transmits it to the transmission module. Here, the print job attribute information is information such as a document name, a user name, or a print setting. In the present embodiment, transmission of the print data from the standard port monitor 412 to the print data reception module 403 is performed via a loopback address which is a print port that is set in response to an instruction by the print management module 401. Specifically, the print data is transferred from the standard port monitor to the NIC 204, and transmission is performed from the NIC 204 to a communication port 413 that the print data reception module has open for reception. The communication port 413 is a port on which the print data reception module 403 listens, and is also referred to as a listening port of the printing system program 308 or the print data reception module 403.

The transmission module 404 receives, and holds in the HD 207 of the print server 101, a response to a reservation for printing from the print management module 401, the print data, print job attribute information from the print data reception module 403, or the like. The transmission module 404 obtains and controls a job status or state of the printer 103 via the device control module 405, and notifies a job status or state of a printer received from the device control module 405 to the print management module 401. In addition, the transmission module 404 transmits print data received from the print data reception module 403 to the printer 103. In accordance with a request from the transmission module 404, the device control module 405 obtains the state of the printer 103, monitors a job status, and performs control such as job cancellation or the like. In response to a rendering instruction from the print management module 401, the printer driver 410 performs conversion from document data generated by an application program or the like to print data that can be interpreted by the printer 103. In a general OS, the print data passes through the standard port monitor 412 from the system spooler 411, and is transferred from a predetermined transmission port.

Note that in the printing system program 308, portions other than the print data reception module 403 may be referred to as an application program for print control.

<Document Information 500, Job Information 510, Printer Information 520, Print Data Reception Module Information 530>

Figure 5A:
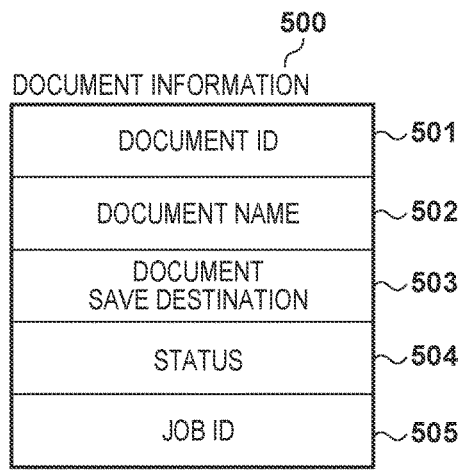
FIGS. 5A to 5D are examples of memory maps that indicate information that a print management module 401 according to a first embodiment holds in a database 104.
Figure 5C:
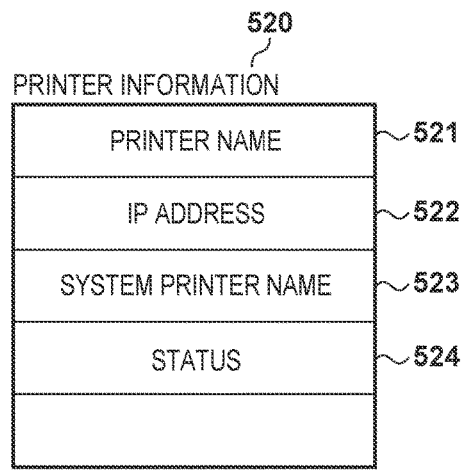

FIG. 5A to FIG. 5D are memory maps that illustrate examples of information that the print management module 401 according to embodiments of the present invention holds in the database 104. In FIG. 5A, document information 500 is generated by the print management module 401 when document data is input from the client terminal 102 or the like.

A document ID 501 is unique information for specifying the document data, and is issued by the print management module 401 when the document data is input. The document ID 501 is passed to the client terminal 102 as a response to a request to input a document, and by the client terminal 102 including the document ID 501 in information of a print instruction request, the print management module 401 specifies the document that is the printing target. A document name 502 is information included in a document input request from the client terminal 102, and is a name displayed as document information by the Web browser of the client terminal 102 after inputting of the document data. In the present embodiment, this is also used in a rendering command to the printer driver 410, which is described later. A document save destination 503 indicates a location at which the document data exists in the database 104. When the document data is input, the print management module 401 determines a location at which to save the document data, and this is held as the document information 500. A status 504 indicates a state of the document data. The print management module 401 dynamically updates the status 504 so that it is a value that corresponds to the state of the document data, such as stand-by, waiting to print, printing, or deletion complete. A job ID 505 is notified from the transmission module 404 when the document is to be printed, and is a unique ID that the print management module 401 holds in the document information 500 of FIG. 5A and the job information 510 of FIG. 5B. The job ID 505 is used to link the document information 500 and the job information 510.

Figure 5B:
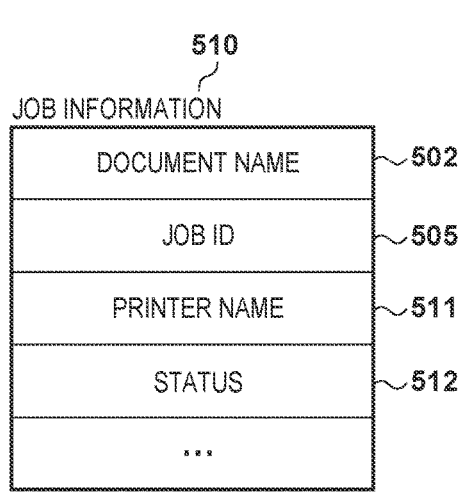
Figure 5D:
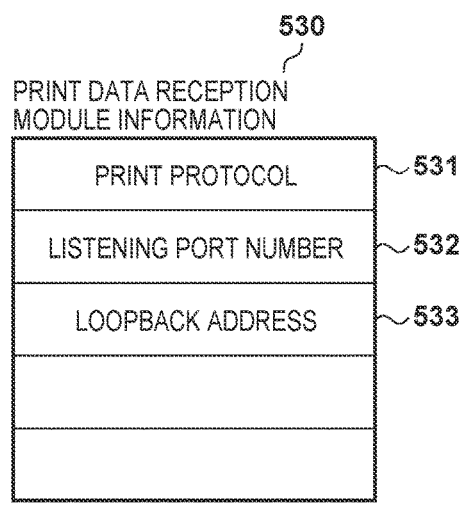
Figure 6:
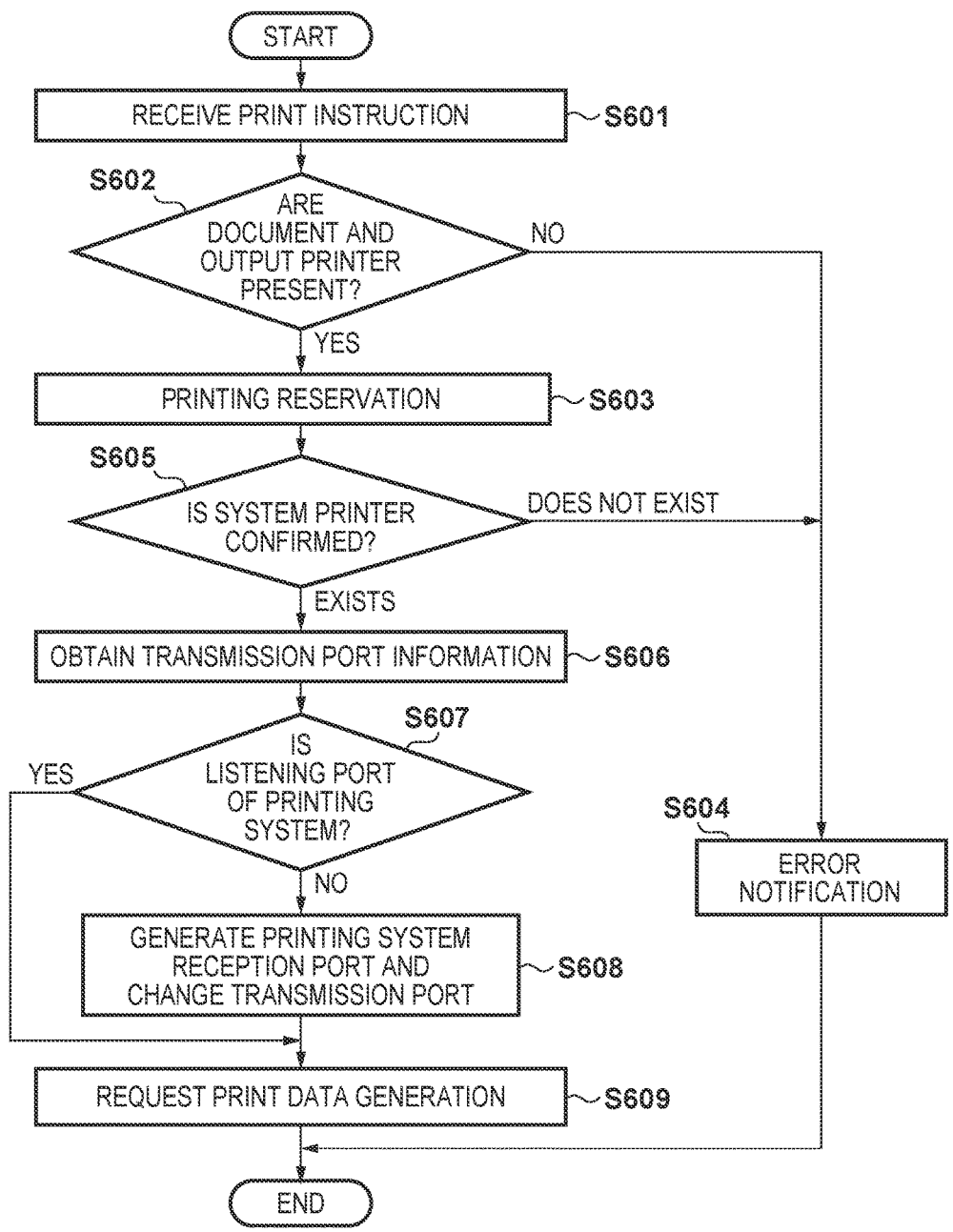
FIG. 6 is a flowchart illustrating processing from the print management module 401 receiving a print instruction from the client terminal 102 until the print management module 401 making a rendering instruction to a printer driver 410.

In FIG. 5B, the job information 510 is generated by the print management module 401 when a print instruction request is received from the client terminal 102 or the like. The document name 502 and the job ID 505 store the same information to that held in the document information 500. A printer name 511 is information included in the print instruction request from the client terminal 102, and the print management module 401 uses it to specify the printer information 520. A status 512 indicates a state of the print job, and the print management module 401 dynamically updates it in response to a notification of a print job state from the transmission module 404.

In FIG. 5C, the printer information 520 is information of the printer 103, which is managed by the print management module 401, and one set is held for each printer. In the present embodiment, although no particular explanation is given in relation to a means of registering printer information to the print management module 401, for example, it is possible to perform registration by an installer program when installing a new printer. A printer name 521 is a name of the printer 103, which is managed by the print management module 401. The printer name 521 is used when displaying on the Web browser of the client terminal 102, and the print management module 401 uses it to specify the printer information 520 from the printer name 511 of the job information 510. An IP address 522 is identification information for discriminating the printer 103 on the network 100, and is information that the print management module 401 passes to the transmission module 404 at a time of a printing reservation request. The transmission module 404 performs transmission of the print data to the printer 103 specified by the IP address 522. A system printer name 523 is used when the print management module 401 confirms that a printer object is present in the OS, and then performs a change of the transmission port. The system printer name 523 is a printer name registered in the operating system. A status 524 indicates a state of the printer 103, and the print management module 401 dynamically updates it in response to a notification of the state of the printer 103 from the transmission module 404. Print data reception module information 530 of FIG. 5D indicates settings information of the print data reception module 403. In the present embodiment, the print data reception module information 530, for example, is set in advance by a user who uses a function of the printing system program 308. The print data reception module information 530 must match information used in an actual operation of the print data reception module 403. A printing protocol 531 indicates a type of a printing protocol by which the print data reception module 403 listens for print data. The print management module 401 refers to the printing protocol 531 when generating a later-described transmission port of the OS. In the present embodiment, a RAW protocol (read after write) is envisioned as a type of the printing protocol. Another printing protocol may be LPR (line printer remote), IPP (Internet Printing Protocol), or the like. A listening port number 532 is a communication port number that the print data reception module 403 has open for reception of the print data. A loopback address 533 is an IP address of the communication port that the print data reception module 403 has open. The loopback address is commonly an IP address that indicates oneself. Conventionally, in IPv4 (Internet Protocol version 4) "127.0.0.1" is used, and in IPv6 (Internet Protocol version 6) "::1" is used.

<Print Initiation Processing of Print Management Module 401>

Hereinafter, explanation is given in regards to print processing according to the present embodiment by using flowcharts. FIG. 6 is a flowchart illustrating processing from the print management module 401 according to embodiments of the present invention receiving a print instruction from the client terminal 102 until the print management module 401 making a rendering instruction to the printer driver 410. In the present embodiment, explanation is given in which document data is input in advance by a user, but performing a print instruction along with reception of the document data is also envisioned. It is assumed that installation of the printer driver 410 in the OS, and creation of the printer object have been performed.

In step S601, the print management module 401 interprets content of the print instruction received from the client terminal 102 or the like via the external interface 402, and holds information. Here, the document ID 501 and the printer name 511 are included as content of the print instruction passed via the external interface.

In step S602, the print management module 401 determines whether the document ID 501 and the printer name 511 held in step S601 are present in the document information 500 and the printer information 520 of the database 104. If both are present, the processing proceeds to step S603. If even one is not present, the processing proceeds to step S604.

In step S603 the print management module 401 makes a printing reservation request to the transmission module 404 via the interface 406. At this point, the print management module 401 obtains the IP address 522 of the printer information 520 specified by the printer name 511, and makes a notification of it and the printer name 521 to the transmission module 404. As a response to the printing reservation request, the print management module 401 receives the job ID 505 from the transmission module 404, and stores it in the document information 500 and the job information 510 of the database 104. Here, the job ID 505 is issued by the transmission module 404. The transmission module 404 holds the printer name 511 and the IP address 522, which are received from the print management module 401, in association with the job ID 505.

In step S605, the print management module 401 obtains the system printer name 523 of the printer information 520 specified by the printer name 511. In addition, the presence in the OS of a printer object having an identification name that matches the system printer name 523 is confirmed. In other words, it is confirmed that the designated printer can be used. Specifically, the print management module 401 obtains a list of printers from the system spooler 411, and the list is searched for one that matches the system printer name 523. If a printer object that has the system printer name 523 is present, the designated printer can be used, and the processing proceeds to step S606. If it is not present, the processing proceeds to step S604.

In step S606, the print management module 401 obtains information of the printer object that matches the system printer name 523 in step S605 from the system spooler 411, and obtains information of the transmission port included in the obtained information. The information of the transmission port to be obtained is an IP address, a type of a printing protocol, and a communication partner port number. Here, in the present embodiment, RAW (read after write), which is widely used in the OS, is envisioned as the printing protocol. As another printing protocol, LPR (line printer remote), IPP (Internet Printing Protocol) or the like may be given; these can be used similarly to as in the present embodiment. A reason to obtain information of the port is because it is necessary to match it to the printing protocol 531, the listening port number 532, and the loopback address 533 on which the later-described print data reception module 403 listens in order to receive the print data. When an information processing apparatus performs data communication, a communication port is used to specify a program of a communication partner, and by the program opening a communication port of a specific communication port number, it is possible to perform data communication with respect to the port and receive data from the program. The port number of the print data reception module 403 is allocated in advance, and is known beforehand. Here, a port specified by a set of the printing protocol 531, the listening port number 532 and the loopback address 533 is also referred to as a reception port of the printing system.

In step S607, the print management module 401 determines whether the information of the transmission port obtained in step S606 matches the print data reception module information 530, i.e. whether it matches the listening port 413 of the printing system program 308; if it matches the processing proceeds to step S609, and if it does not match the processing proceeds to step S608.

If the information of the transmission port obtained in step S606 does not match the reception port of the printing system, in step S608 the print management module 401 makes a transmission port generation request to the system spooler 411 based on the print data reception module information 530. In response to this request, in the system spooler 411, a new transmission port that corresponds to the reception port of the printing system is generated. In addition, the print management module 401 requests the system spooler 411 to change the transmission port corresponding to the system printer name 523 to the newly generated transmission port.

In step S609, the print management module 401 obtains the job ID 505 of the document information 500 specified by the document ID 501 and the document data saved at the document save destination 503, and performs a rendering instruction passing the job ID 505 and the document data to the printer driver 410. In the present embodiment, the print management module 401 performs the rendering instruction adding the job ID to the document name 502. In other words, the printer driver 410 is requested to generate the print data. In step S604, the print management module 401 notifies an error to the client terminal 102 via the external interface 402, and then processing terminates.

By the above procedure, upon receiving a print instruction, i.e. at the time of print initiation, the printing system program 308 can set its listening port as the transmission port of system spooler, and issue a print data (or a print job) generation request.

<Print Data Processing of Print Data Reception Module 403>

FIG. 7 is a flowchart illustrating processing from the print data reception module 403 according to embodiments of the present invention receiving print data from the printer driver 410 until notifying of the transmission module 404.

In step S701, the print data reception module 403 opens and listens on the communication port 413 (in other words, listens at the communication port 413), which is necessary for receiving print data from the printer driver 410. The communication port 413 is specified by the loopback address and the listening port number of the print data reception module 403, and is the reception port of the printing system as described in FIG. 6. Here, for the information of the communication port, configuration may be taken to obtain information stored in the database 104 when the print data reception module 403 activates, or configuration may be taken to receive communication port information from the print management module 401. In the present embodiment, this is not particularly limited. Note that configuration may be taken such that the procedure of FIG. 7, for example, is started triggered by the operation start of the print server 101, and the communication port 413 is listened at during operation of the print server 101.

In step S702, the print data reception module 403 receives the print data that the printer driver 410 generates after it passes the standard port monitor 412. As explained in FIG. 6, the transmission port of the standard port monitor 412 is changed to the communication port 413. At this point, the print data reception module 403 notifies the transmission module 404 that reception of the print data has started.

Step S7031 to step S7032 is repeated until communication terminates, in other words until reception of the print data completes. However, step S7032 is a block that illustrates the end of the loop, and is not processing in particular. In step S703, the print data reception module 403 continues reception until communication completes, conforming to the printing protocol. When reception completes, the print data reception module 403 determines that the generation processing of the print data by the printer driver 410 has completed, and the processing proceeds to step S704. For print data generated by the printer driver 410 to be spooled by the system spooler 411, the completion of reception of the print data can be made to be that spooling of the print data is complete.

When reception of data is complete, in step S704 the print data reception module 403 performs analysis of the received print data, and obtains print job attribute information such as the document name and the print attribute. In step S705, in addition to the print data received in in step S703 and the print job attribute information obtained in step S704, the print data reception module 403 notifies the transmission module 404 that reception of the print data has completed.

<Print Transmission Processing of Transmission Module 404>

FIG. 8 is a flowchart illustrating processing from the transmission module 404 according to embodiments of the present invention accepting print data and print job attribute information from the print data reception module 403 until discharge in the printer 103 completes.

In step S801, the transmission module 404 receives the print data and the print job attribute information from the print data reception module 403. This is processing that corresponds to step S705 in FIG. 7.

In step S802 the transmission module 404 extracts the job ID 505 from the document name included in the received print job attribute information, and confirms whether it matches the job ID 505 held at the time of the printing reservation request in step S603. If the job ID 505 matches the processing proceeds to step S803, if it does not match the print data is discarded, and the processing terminates. Note that the job ID 505 may be included in the print job attribute information.

In step S803, the transmission module 404 uses the IP address 522 and the printer name 511 linked to the job ID 505 to transmit the print data to the printer 103.

In step S804, the transmission module 404 starts monitoring of the job status and the printer status of the printer 103 via the device control module 405.

In step S805, the transmission module 404 queries the device control module 405 and determines whether discharge of the print job has completed, and notifies the state of the job (and the state of the printer) as the status of the job to the print management module 401. If the result of the transmission module 404 querying the device control module 405 is that it is determined that discharge has completed, the processing proceeds to step S806.

In step S806, the transmission module 404 notifies the print management module 401 the job ID 505 along with that the print job has completed.

By performing the above processing, it is possible to transfer the print data and print job attribute information from the standard port monitor to the printing system, and a function that is implemented using a custom port monitor can be realized by using the standard port monitor without using a custom port monitor. Hence, in an operating system that cannot use a custom port monitor, it is also possible to monitor a state of print jobs or a state of a printer and manage print jobs by an application program such as a printing system program.

Second Embodiment

The present embodiment adds, to the first embodiment, processing for a case in which the print data reception module 403 cannot analyze the print data. The print data is described using a page description language that the printer can interpret, and because description details differ depending on each printer vendor's printer driver, the possibility that the print data cannot be analyzed is sufficiently present. In the first embodiment, the print data reception module 403 analyzed the print data in step S704 of FIG. 7 and obtained the job ID 505, and then the transmission module 404 specified the print job in accordance with the job ID 505. However, if analysis of the print data is not possible, it becomes impossible for specification of the print job to be performed by the transmission module 404. Processing for a case in which the print data cannot be analyzed is explained below by using FIG. 9A, FIG. 9B, and FIG. 10. Note that, in the present embodiment, the system configuration or configuration of the print server are the same as in the first embodiment.

<Supported Printer List, Printer Information>

Figure 9A:
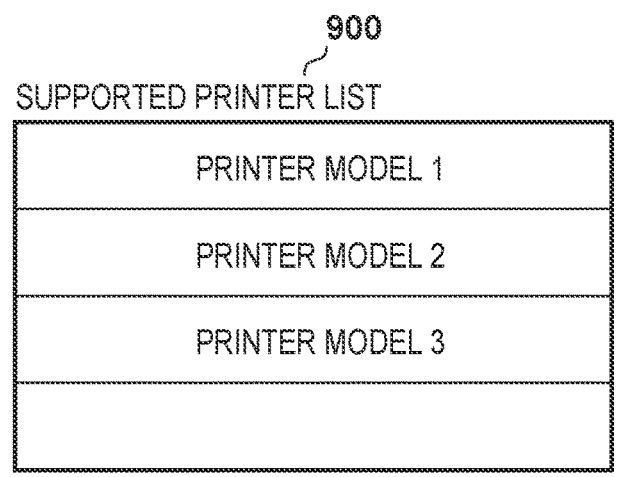
FIG. 9A and FIG. 9B are memory maps that illustrate examples of information that the print management module 401 according to a second embodiment holds in the database 104.
Figure 9B:
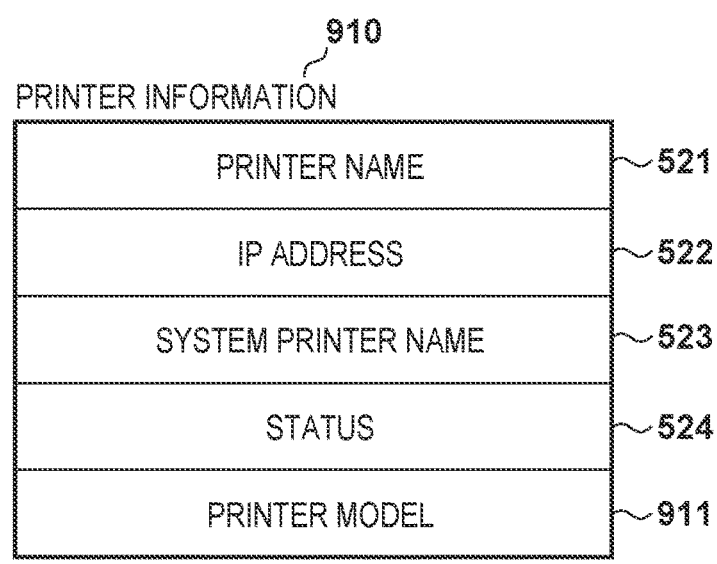

FIG. 9A and FIG. 9B are memory maps that illustrate examples of information that the print management module 401 according to embodiments of the present invention holds in the database 104. Note that the document information 500, the job information 510, and the print data reception module information 530 according to the first embodiment, which are described by FIG. 5, are similarly held. A supported printer list 900 of FIG. 9A is a list of printers for which the print data reception module 403 can perform print data analysis. The print management module 401 holds the supported printer list 900 in advance.

Printer information 910 of FIG. 9B is information that extends the printer information 520. Similar to the printer information 520, the printer information 910 is information of the printer 103 which is managed by the print management module 401, and one set is held for each printer. The printer name 521 to the status 524 are the same as in the printer information 520. A printer model 911 is model information of the printer 103, and is set when the print management module 401 generates the printer information 910. The printer model 911 may be obtained by the print management module 401 from the printer 103 via the transmission module, or may be obtained from the printer driver 410. The printer model of the supported printer list 900 and the printer model 911 are set to the same value if the models are the same.

<Processing of Print Management Module 401 when Print Data Cannot be Analyzed>

Figure 10:
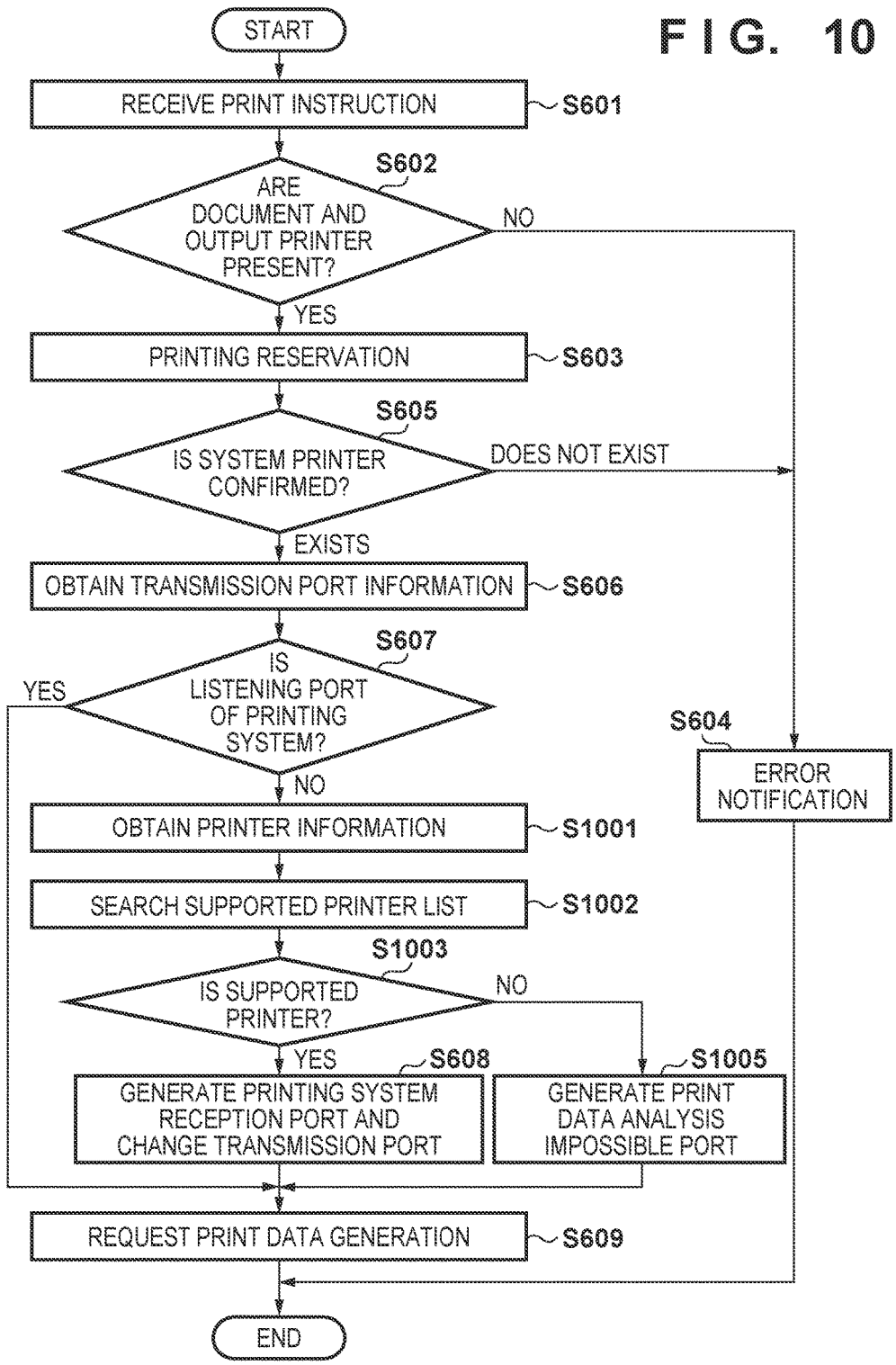
FIG. 10 is a flowchart illustrating processing of the print management module 401 when print data cannot be analyzed.

FIG. 10 is a flowchart illustrating processing of the print management module 401 when print data cannot be analyzed. In the present embodiment, from step S601 to step S607, and step S608 and step S609 are the same as in the first embodiment, and explanation thereof is omitted.

In step S1001, the print management module 401 obtains the printer information 910 from the database 104.

In step S1002, the print management module 401, by the database 104, searches the supported printer list 900 for something that matches the printer model 911 of the printer information 910 obtained in step S1001.

In step S1003, as a result of the search in step S1002, if something that matches the printer model 911 is present, the processing proceeds to step S608. If the printer model 911 was not found in the supported printer list 900, the print management module 401 determines that analysis of printing in the print data reception module 403 is not possible, and the processing proceeds to step S1005.

In step S1005, the print management module 401 instructs the system spooler 411 to generate a print data analysis impossible port. In the present embodiment, the print data analysis impossible port is a communication port that can add information to a printing protocol portion. Specifically, there is a queue name used in the LPR (line printer remote) protocol and a document name notified in the IPP (Internet Printing Protocol) protocol. In the present embodiment, use of LPR is explained as an example. When making a transmission port generation request to the system spooler 411, the print management module 401 designates the printing protocol as LPR in the request content, and designates the job ID 505 obtained in step S603 as the queue name. A designated port is a listening port of the printing system that uses the loopback address. In addition, the print management module 401 makes a request to the system spooler 411 to change the transmission port corresponding to the system printer name 523 to the newly generated transmission port.

The print data reception module 403 listens on the listening port generated in step S1005 of FIG. 10, and when receiving the print data, executes the procedure of FIG. 7 similarly to in the first embodiment. This print data is not supported by the printing system program 308 and cannot be analyzed, but instead, the job ID is designated as the queue name of the LPR protocol of the listening port by the procedure of FIG. 10. Accordingly, in step S704 of FIG. 7, if the protocol designated for the listening port is LPR, the print data reception module 403 of the present embodiment uses the value of the queue name as the job ID. In step S705, based on the job ID, an analysis result or the like is notified to the transmission module. If the protocol designated for the listening port is not LPR or if the value of the queue name is within the range of original queue names, in step S704 the print data (job data) is analyzed as explained in the first embodiment. Of course, this is an example, and configuration may be taken to segment the range of values that can be designated as original queue names from the range of values that can be designated as the job name.

With such a configuration, when analyzing the print data received from the standard port monitor 412 in step S704 of FIG. 7, the print data reception module 403 can obtain the job ID 505 from the queue name in accordance with an exchange under the LPR protocol. Accordingly, even in the case where a model of a printer used for printing is not supported and it is not possible to analyze the print data (or job data), the printing system program 308 can transmit the job to a designated printer, and cause printing to be performed, and can monitor the jobs or the printer. In this way, it can be distinguished that the listening port is generated in step S1005. Of course this is an example, and any method may be used if it can distinguish that the listening port is generated in step S1005.

By the above processing, even when print data cannot be analyzed, a function realized by using a custom port monitor can be realized without using a custom port monitor.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-259279, filed Dec. 22, 2014 which is hereby incorporated by reference herein in its entirety.

What is claimed is:

1. An information processing apparatus in which an application performing print control and a printer driver corresponding to an output destination printer operate, the apparatus comprising, at least one memory storing instructions related to a module receiving print data from the printer driver via a standard port monitor provided by an operation system of the information processing apparatus; and at least one processor which is capable of executing the instructions causing the information processing apparatus to:

by performing a listening at a listening port designated by a loopback address, receive from the printer driver, on which the listening port set according to a modifying instruction performed by the application is used as a transmission port, print data generated based on data from the application;

determine, in accordance with completion of communication corresponding to a reception of the print data, a spooling completion of the print data;

specify, from the received print data, information corresponding to the data from the application; and notify to the application the determined spooling completion, the print data received from the printer driver, and the specified information, wherein the application transmits the print data from the module to the output destination printer and monitors related to the transmitted print data.

2. The information processing apparatus according to claim 1, wherein the application performs the modifying instruction at a timing of a print start.

3. The information processing apparatus according to claim 1, wherein the print data from the printer driver is received by a RAW protocol.

4. The information processing apparatus according to claim 1, wherein the application performs a printing reservation before requesting the printer driver to generate print data, and issues a job id that corresponds to the printing reservation.

5. The information processing apparatus according to claim 4, wherein the application, if the output destination printer is a printer that is not supported, sets, to the printer driver, LPR as a protocol of the transmission port and the job ID as a name of a corresponding queue.

6. The information processing apparatus according to claim 1, wherein the printer driver uses a standard port monitor, that an operating system that manages the information processing apparatus provides, to output print data.

7. A non-transitory computer readable medium storing a program for causing an information processing apparatus, including at least one memory storing instructions related to a module receiving print data from a printer driver via a standard port monitor provided by an operation system of the information processing apparatus, to execute a method, the method comprising:

by listening on a port designated by a loopback address, receiving from a printer driver, for which the listening port set according to a modifying instruction performed by the application is used as a transmission port, print data generated based on data from the print control application;

determining, in accordance with completion of communication corresponding to a reception of the print data, a spooling completion of the print data;

specifying, from the received print data, information corresponding to the data from the print control application; and notifying to the application the determined spooling completion, the print data received from the printer driver, and the specified information, wherein the application transmits the print data from the module to the output destination printer and monitors related to the transmitted print data.

8. A method for an information processing apparatus including at least one memory storing instructions related to a module receiving print data from a printer driver via a standard port monitor provided by an operation system of the information processing apparatus, the method comprising:

by listening on a port designated by a loopback address, receiving from a printer driver, for which the listening port set according to a modifying instruction performed by the application is used as a transmission port, print data generated based on data from the print control application;

determining, in accordance with completion of communication corresponding to a reception of the print data, a spooling completion of the print data;

specifying, from the received print data, information corresponding to the data from the print control application; and notifying to the application the determined spooling completion, the print data received from the printer driver, and the specified information, wherein the application transmits the print data from the module to the output destination printer and monitors related to the transmitted print data.

9. The information processing apparatus according to claim 4, wherein the specified information includes ID information, and wherein the specified information is notified so that a confirmation on whether the ID information included in the specified information matches the job id corresponding to the printing reservation is performed by the application.

* * * * *